United States Patent [19]
Smith

[11] 4,271,953
[45] Jun. 9, 1981

[54] AUTOMATIC FEEDING HOPPER EMPLOYING AN ANTI-JAMMING MECHANISM

[75] Inventor: Donald C. Smith, Pottsville, Pa.

[73] Assignee: Zapata Industries, Inc., Frackville, Pa.

[21] Appl. No.: 941,365

[22] Filed: Sep. 11, 1978

[51] Int. Cl.³ .............................................. B65G 1/02
[52] U.S. Cl. .................................. 198/347; 198/455; 198/526; 221/175
[58] Field of Search ............... 198/347, 453, 454, 455, 198/526; 221/175, 182

[56] References Cited

U.S. PATENT DOCUMENTS

| | | | |
|---|---|---|---|
| 1,416,763 | 5/1922 | Thom | 198/455 X |
| 2,629,481 | 2/1953 | Stover | 198/455 |
| 3,067,852 | 12/1962 | Barr | 198/381 |
| 4,006,812 | 2/1977 | Everett et al. | 198/347 |

Primary Examiner—Jeffrey V. Nase
Attorney, Agent, or Firm—Shapiro and Shapiro

[57] ABSTRACT

An automatic feeding hopper employs a reservoir for storing disk-like objects in a plurality of substantially horizontal rows in a substantially vertical plane. A conveyor adjoins the reservoir for engagement with a substantial portion of the lowermost row of disk-like objects in the reservoir to remove the disk-like objects from the reservoir, an exit chute is positioned adjacent the conveyor to receive the disk-like objects in a single row, and a deflecting member is positioned near the entrance to the exit chute to guide and maintain the flow of disk-like objects in a single row from the conveyor into the exit chute. The deflecting member has an upper concavely curved surface intersected by a lower curved surface which leads into a side of the exit chute, the curved surfaces meeting at an edge located a distance above the surface of the conveyor slightly more than the diameter of a disk-like object. A magnetic member is positioned with respect to the reservoir and related to the deflecting member and the conveyor to remove disk-like objects above the lowermost row of objects, and a mechanism is provided for rotating the magnetic member.

11 Claims, 6 Drawing Figures

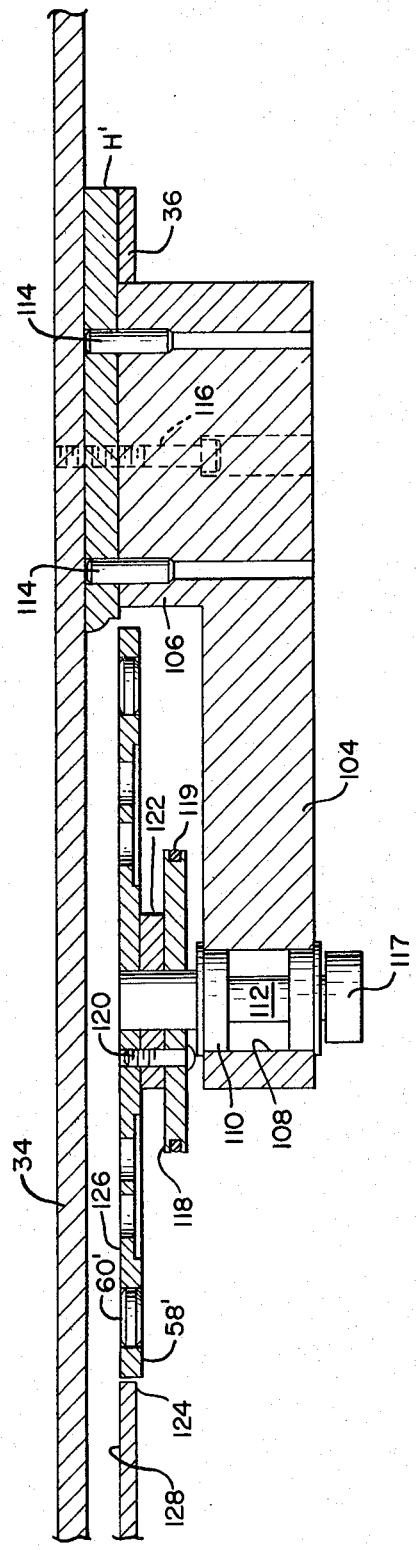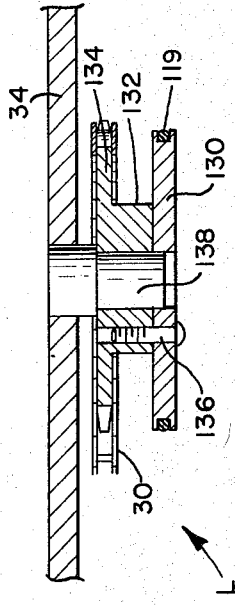

4,271,953

AUTOMATIC FEEDING HOPPER EMPLOYING AN ANTI-JAMMING MECHANISM

BACKGROUND OF THE INVENTION

The invention relates to apparatus for feeding disk-like objects at a fast, uniform rate, and is more particularly directed to improvements in means for preventing jamming of disk-like objects in such apparatus.

In U.S. Pat. No. 4,006,812, assigned to the assignee of the present invention, an automatic feeding hopper is disclosed for feeding disk-like objects such as shells or crowns for bottles at speeds up to and in excess of 4,000 pieces per minute. This equipment has the capability to maintain a flow of crowns through the hopper equal to the demands upon it, such as the demands imposed by a seal liner machine which molds seal liners of plastic material within crowns.

In the automatic feeding hopper of the aforementioned patent, a reservoir is provided which is dimensioned to receive a plurality of substantially horizontal rows of disk-like objects in a substantially vertical plane. A conveyor adjoins the reservoir for engagment with the substantial portion of the lowermost row of objects in the reservoir and for removing the disk-like objects from the reservoir for delivery in a single row into a vertically oriented supply chute. A deflecting or guide member having an upper concavely curved surface is intersected by a lower curved surface leading into a side of the exit chute, and the surface meet at an edge or joint located a distance above the surface of the conveyor slightly more than the diameter of a disk-like object. A nozzle directs air under pressure to an area just above the point where the concavely curved surfaces meet so that jamming at this point will be prevented. The crowns above the crowns on the conveyor are circulated back into the reservoir by the blast of air, so that the recirculated crowns may be positioned directly on the conveyor.

It has been found that the use of compressed air causes substantial wear on the base plate of the hopper magazine or reservoir in the area adjoining the deflecting member, and it has been necessary to use a great amount of compressed air; a ¼ inch line discharging air at 60–70 p.s.i. Such wear has necessitated replacement of the worn surface. Considering the cost of energy for providing the compressed air, the down-time to replace worn parts and the cost of the worn parts, it has been determined that it costs approximately $1,200 per year per hopper to use compressed air as the means to prevent jamming. Since more than 100 hoppers are being used, it will be apparent that the cost of using compressed air anti-jamming means is not inexpensive.

Various magnetic arrangements have been used as part of or in conjunction with hoppers or other feeding apparatus. Stover U.S. Pat. No. 3,065,841, Daniels 3,269,514 and 3,863,802, Matteling 3,338,372 and Barr 3,067,852 each disclose a rotatably mounted disk having circumferentially spaced magnetic elements for engaging and moving crowns or shells from one point to another. In Barr, the rotatable disk having the spaced magnetic elements acts upon improperly oriented crowns to remove them from a conveyor belt with the aid of a stripper plate.

SUMMARY OF THE INVENTION

It is an object of the invention to provide an improved and more efficient automatic feeding hopper for high-speed, uniform feeding of disk-like objects.

Another object of the invention is to provide an improved anti-jamming device in the context of an automatic feeding hopper which includes a reservoir, a driven conveyor, a deflecting member and an exit chute.

A further object of the invention is to provide an improved anti-jamming device which is less expensive than the anti-jamming device it is designed to replace, and further, which possesses characteristics which make it superior in operation.

Apparatus in accordance with the invention includes a reservoir for storing the disk-like objects, the reservoir being dimensioned to receive a plurality of substantially horizontal rows of disk-like objects in a substantially vertical plane. A conveyor is positioned adjoining the reservoir for engagement with a substantial portion of the lowermost row of objects in the reservoir and for removing the disk-like objects from the reservoir. The disk-like objects are caused by gravity to engage the conveyor, which is positively driven. An exit chute is located adjacent the conveyor to receive the disk-like objects from the conveyor, and a deflecting member is positioned in the reservoir near the entrance to the exit chute to guide and maintain the flow of disk-like objects in a single row from the conveyor into the exit chute. The deflecting member has an upper concavely curved surface intersected by a lower curved surface leading into a side of the exit chute, the surface meeting at an edge located a distance above the surface of the conveyor slightly more than the diameter of a disk-like object. Magnetic means is positioned with respect to the reservoir and related to the deflecting member and the conveyor for removing disk-like objects above the lowermost row of objects on the conveyor, and means is provided for rotating the magnetic means.

Preferably, the magnetic means comprises a rotatable disk member of non-magnetic material having a plurality of circumferentially spaced permanent magnets mounted therein. The rotatable disk member, and the magnets, is positioned with a linear surface thereof coplanar with an interior surface of the reservoir and with the annular edge of the disk adjacent the upper concavely curved surface of the deflecting member.

These, and other objects and advantages of the invention will be apparent from the following detailed description of a preferred embodiment of the invention.

BRIEF DESCRIPTION OF THE DRAWINGS

FIG. 5 is a cross-sectional view taken approximately in the plane of line 5—5; and FIG. 6 is a cross-sectional view taken approximately in the plane of line 6—6 of FIG. 4.

DESCRIPTION OF THE PREFERRED EMBODIMENT

Since the improved anti-jamming and feeding means of the invention is adapted for use in conjunction with an automatic feeding hopper as described in detail in U.S. Pat. No. 4,006,812; that is, the improved anti-jamming and feeding device is used in lieu of the compressed air means as described in such patent, only so much of such feeding hopper will be described as deemed necessary to provide a setting for the present invention.

Figure 1:
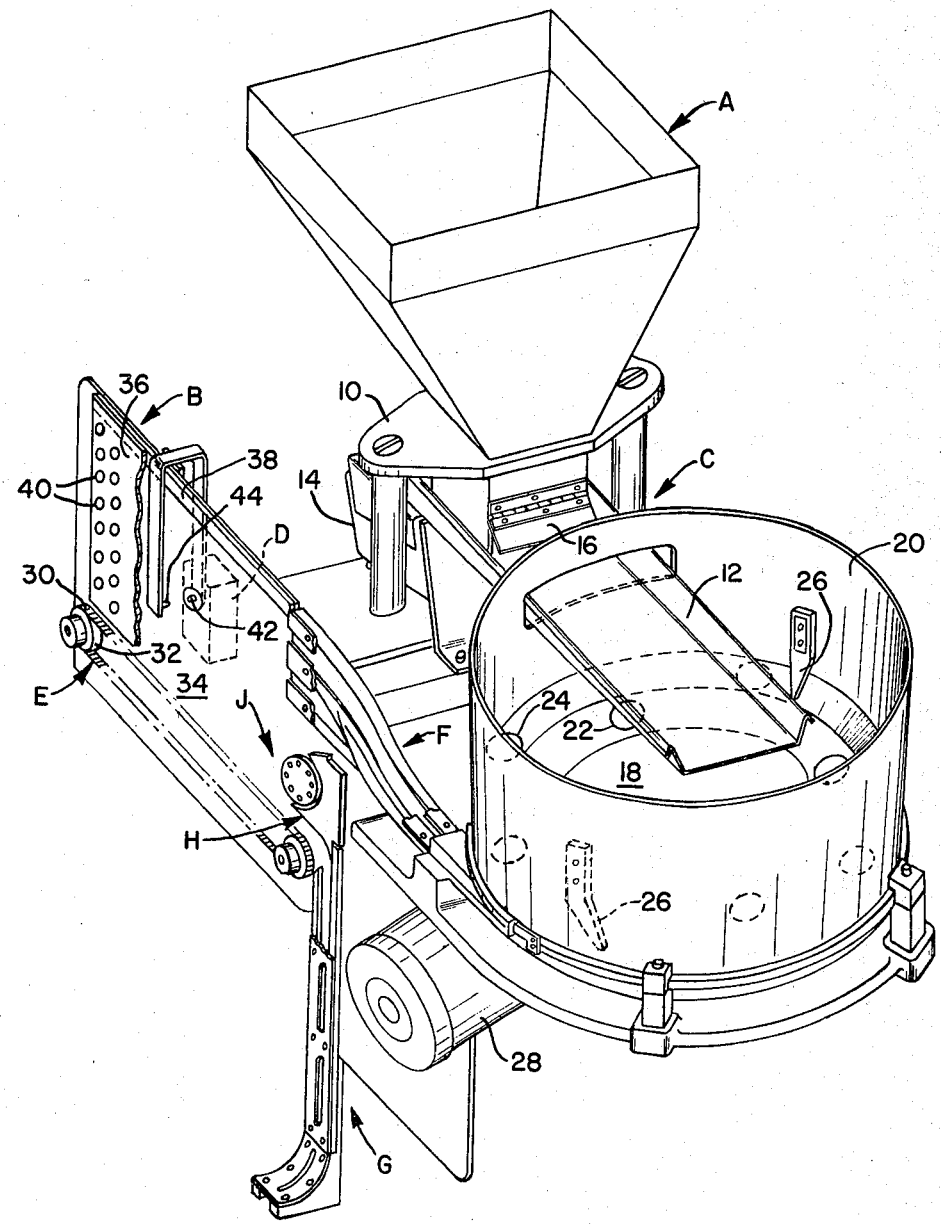
FIG. 1 is a perspective view of a hopper including the improved anti-jamming means of the invention.

Referring to FIG. 1, a hopper made in accordance with the invention comprises a supply chute A, a reservoir B for storing the disk-like objects, and feeding means C located intermediate the supply chute and the reservoir for feeding of disk-like objects to the reservoir. The description which follows will refer to the hoppering of shells or crowns, designated Cr. It will be understood, however, that so designating the disk-like objects in the description and drawings is for convenience only; it is not intended by way of limitation upon the structure about to be described. Conveying means E is associated with the reservoir for removing the crowns at a uniform rate from the reservoir. An orientation device F is positioned at the entrance to the reservoir so that asymmetrical objects such as crowns will enter the reservoir facing in only one direction to leave the reservoir in the same direction. The feeding means C may be a belt conveyor or a vibratory feeder, as shown.

The supply chute A is suitably supported on a base 10 and related to the feeding means C so that the crowns drop by gravity onto the inclined trough 12 of a vibratory feeder 14. A gate 16 is hinged to the supply chute A at the bottom thereof to prevent the crowns from bridging at this point and to ensure a steady flow of crowns from the supply chute to the inclined trough 12. The crowns slide down the trough 12 onto a conically shaped bowl 18 which is mounted for rotation in a clockwise direction as viewed in FIG. 1. A stationary annular guard 20 is positioned to extend around and above the rotatable bowl. Permanent magnets 22, 24 are set in circumferentially spaced relation within the bowl 18 to minimize jamming of the crowns as they leave the bowl in their passage toward the orientation device F. Also, the permanent magnets 22, 24 break up masses of crowns for more even distribution and ensure that the crowns are conveyed through the passage leaving the bowl instead of slipping on the bowl when it rotates.

To further assist in breaking up masses of crowns and to ensure more even distribution around the rotating bowl 18 when the machine is in operation, a pair of bumper elements 26 are provided on opposite sides of the bowl as shown in FIG. 1. Each of the bumper members preferably has a resilient finger portion which extends at an angle into the lower portion of the bowl to break up masses of crowns.

As also shown in FIG. 1, a drive mechanism including a motor 28 is provided to rotate the bowl 18 and to drive the conveyor means E. The conveyor means is in the form of a chain and sprocket arrangement 30, 32, the chain passing over a pair of the spaced sprockets with one of the sprockets being driven by the motor 28 by conventional means such as a belt and pulley. If desired, the bowl and the conveyor chain may be driven by separate drive means.

Still referring to FIG. 1, the reservoir B includes a back plate 34 and a cover plate 36. These plates are vertically arranged and spaced apart a distance slightly greater than the height or thickness of a crown. The desired spacing is accomplished by the use of a spacer 38 of appropriate thickness between the back and cover plates at the top and along the sides of the plates. The bottom is left open to allow the presence of the conveying means or the chain 30, which is associated with the reservoir to remove the crowns from the reservoir. Since crowns may have sharp edges, it is preferred that the front cover plate be made of steel to resist cutting and abrasion. In such case, the front cover plate is provided with perforations or openings 40 to allow one to view and inspect the contents of the reservoir during operation of the hopper. Where the disk-like objects do not have sharp or cutting edges, the front plate may be glass or a rigid transparent plastic material. The upper reach of the chain is located to move between the back and cover plates to fill up the space between the plates with only a slight amount of clearance to allow movement of the chain. Instead of a chain and sprocket arrangement, an abrasion-resistant belt of high-friction material and a pulley may be used. The chain delivers the crowns to the exit chute G.

As described more fully in U.S. Pat. No. 4,006,812, a control means or sensor D which is responsive to the quantity or level of crowns in the reservoir B, and which is connected to the feeding means C, includes a photosensitive device 42 responsive to light from a source 44 to effect the necessary control. The control means serves to maintain a predetermined level of crowns in the reservoir. Other components and the operation of the photodetecting device and the control means are described in detail in the aforesaid patent.

Figure 2:
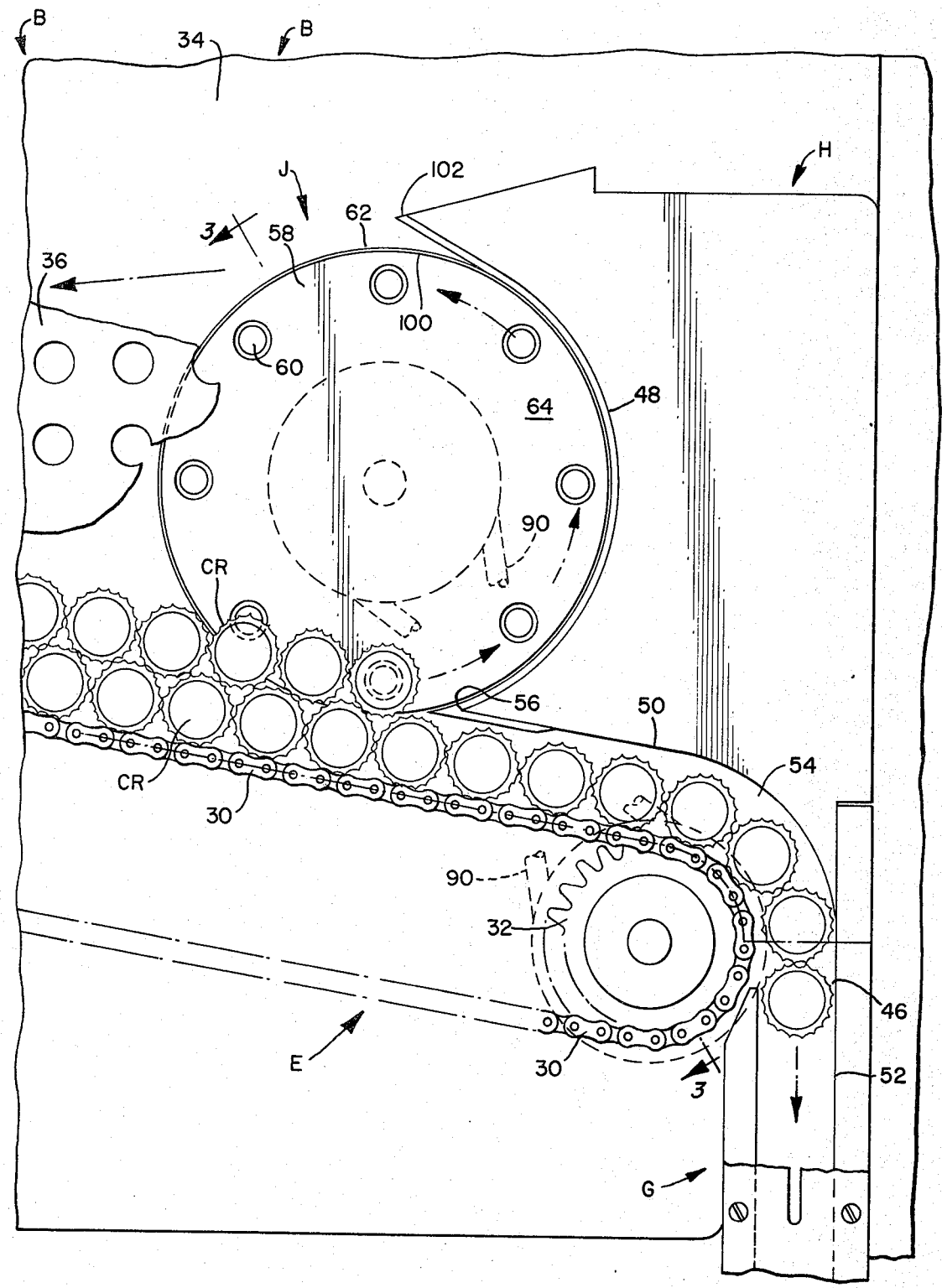
FIG. 2 is an enlarged view of that portion of the hopper of FIG. 1 which shows the magnetic means constituting the anti-jamming device of the invention positioned with respect to the reservoir and as related to the deflecting member and the conveyor.
Figure 3:
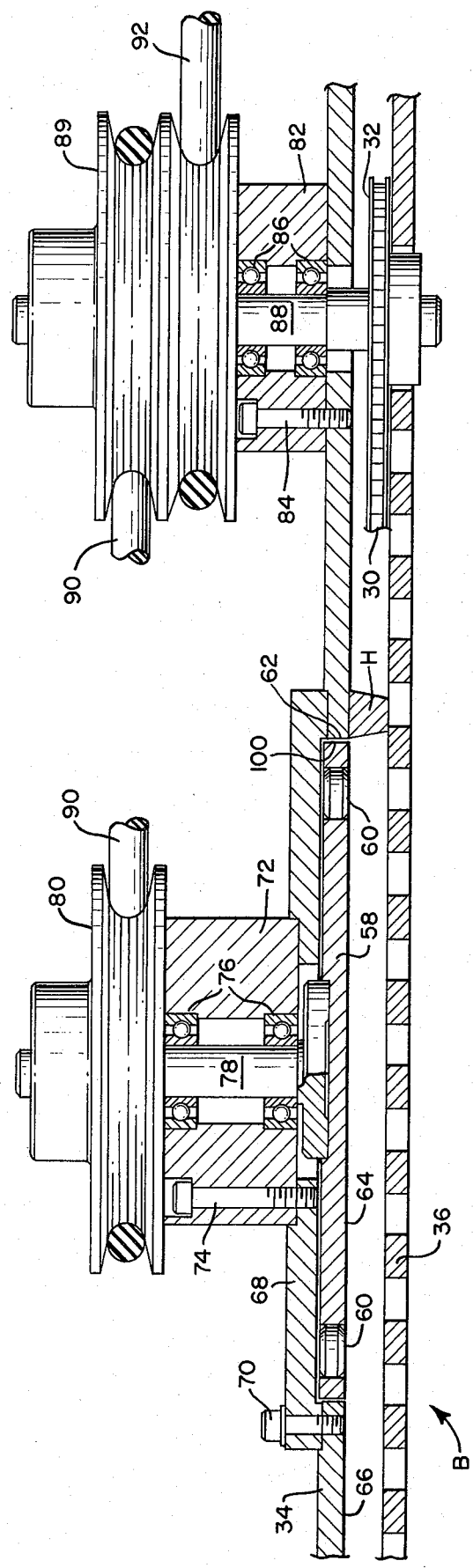
FIG. 3 is a cross-sectional view taken approximately in the planes of lines 3—3 of FIG. 2.

As shown in FIGS. 2 and 3, a deflecting member H is positioned in the reservoir near the entrance 46 to the exit chute G. The deflecting member has an upper concavely curved surface 48 and a lower curved surface 50 leading into a side 52 of the exit chute. Actually, the curved surface 50 is spaced above the surface of the chain 30 a distance slightly more than the diameter of a crown Cr and the curvature of the surface is such that a smooth curved path 54 is provided for entry of the crowns in a single row into the exit chute G. The curved surface 50 intersects or meets with the curved surface 48 at the edge or point 56.

In providing the passageway 54 for guiding the crowns into the exit chute G, the edge or point 56 of the deflecting and guide member H is unavoidable; every guide member has boundaries. It is at this area that compressed air has been used to remove the crowns which unavoidably are positioned upon the lowermost row of crowns or the crowns positioned on the chain 30, and it is at this point that it is necessary to remove the crowns which the moving underlying crowns tend to draw into the passageway 50 for which there is no space for entry. It is here that the jamming tends to occur, and wear has occurred because of the use of air under substantial pressure.

In order to reduce the wear at this area and, as subsequently will be explained, to provide additional advantages, magnetic anti-jamming means J is positioned with respect to the reservoir B and related to the deflecting member H and the conveyor E for removing the disk-like objects or crowns above the lowermost row of objects, and means is provided for rotating the magnetic anti-jamming means J.

As shown in FIGS. 2 and 3, the magnetic anti-jamming means J comprises an annular disk member 58 of non-magnetic material having a plurality of circumferentially spaced permanent magnets 60 mounted therein. The magnets may be secured within the openings of the disk 58 in any suitable manner, as by swedging in the edges surrounding each opening over the magnet. As shown in FIG. 3, the front surface of each magnet 60 is coplanar or flush with the front surface of the disk 58. The disk 58 having the magnets set and secured therein is positioned within an opening 62 in the rear wall 34 of the reservoir B with a small amount of clearance and mounted so that the front or operating surface 64 of the disk and the magnets are flush or coplanar with the adjoining surface 66 (FIG. 3) of the reservoir wall 34.

As shown in FIG. 3, the disk 58 and the plurality of circumferentially spaced magnets mounted therein is mounted for rotation. A support plate 68 is secured by bolts 70, one of which is shown, to the back plate 34 of the reservoir. A bearing assembly 72 is secured by bolts 74, one of which is shown, to the support plate 68. The bearing assembly includes a pair of spaced bearings 76 for a shaft 78, one end of which is secured to the disk 58. A pulley 80 is fixed to the opposite end of the shaft.

As also shown in FIG. 3, one of the sprockets 32 of the chain-sprocket conveyor arrangement 30, 32 is provided with a support bearing block 82 which is mounted upon and secured to the rear face of the reservoir wall 34 by bolts 84, one of which is shown. The bearing block has spaced bearings 86 for a shaft 88, one end of which has the sprocket 32 secured thereto. A double groove pulley 89 is fixed to the other end of the shaft. One belt 90 extends between the pulley 89 and the pulley 80 for the disk member 58 having the magnetic elements mounted therein, and a second belt 92 extends from the pulley 89 to a driving means (not shown) coupled to the drive motor 28 to enable rotation of both the disk member 58 and the conveyor chain 30. If desired, separate drive means may be provided for the disk member and for the conveyor chain.

As will be apparent from a viewing of FIGS. 2 and 3, the peripheral edge 100 of the rotatable disk member 58 is closely adjacent the concavely curved surface 48 of the deflection member H. The dimensions of the disk member, the location of the magnets 60 with respect to the edge 100 of the disk, and the size and strength of the magnets are selected so that the strength of the magnetic field exerted by the magnets is sufficient to attract and hold the crowns Cr which come in the path of the magnets when the disk member is rotated in a counterclockwise direction during the operation of the hopper. During such operation, the chain 30 moves in a clockwise direction, as viewed in FIG. 2. As will be evident from FIG. 2, the curved surface 48 subtends an arc approximately one-half the circumference of the disk 58.

During operation of the hopper, the crowns Cr above the lowermost row of crowns which are on the chain 30 come under the influence of the magnets 60 and are carried in an annular path adjacent the concave surface 48. The disk, and the magnets mounted therein, are rotated at a rate sufficiently high to cause the crowns attracted by the magnets to be ejected by centrifugal force out into the reservoir when the crowns pass the end 102 of the upper concavely curved surface 48. Thus, the crowns are recirculated back into the reservoir where they may become positioned directly upon the moving chain 30 for entry into the exit chute G.

For exemplary purposes only, the diameter of the disk member 58 may be approximately 6.5 inches, and the circular center line for the openings or holes within which the permanent magnets 60 are positioned may have a diameter of approximately 5.5 inches. Preferably, there are eight (8) permanent magnets set in a disk member of such diameter. When the disk member is rotated at a speed of approximately 750 to 800 rpm, the peripheral speed imparted to the magnets in this example is approximately 1,080 feet per minute. The centrifugal force created by such rate of rotation causes the crowns to be ejected away from the deflecting member when the crowns magnetically held on the rotating disk member pass the end 102 of the deflecting member. The substantial centrifugal force imparted to the crowns by the rotating disk member serves to distribute the crowns far out into the reservoir, and such "spacing out", so to speak, contributes to better feeding and distribution of the crowns upon the chain for movement of these recirculated crowns into the exit chute.

The described relationship of the disk member having the plurality of circumferentially spaced magnets mounted therein with respect to the deflecting member and the conveyor eliminates the wear previously caused by the use of compressed air. Also, the hopper operates more efficiently by eliminating dead spots that impede the feeding of crowns out of the reservoir.

The embodiment of the invention as hereinbefore described is best utilized in original equipment. Where automatic feed hoppers of the type described in the aforementioned U.S. Pat. No. 4,006,812 are in the field, and it is desired to replace the compressed air anti-jamming means with the magnetic anti-jamming means of the invention, an arrangement as illustrated in FIGS. 4, 5 and 6 may be utilized in a modification kit to furnish the existing hoppers with magnetic anti-jamming devices of the invention.

Figure 4:
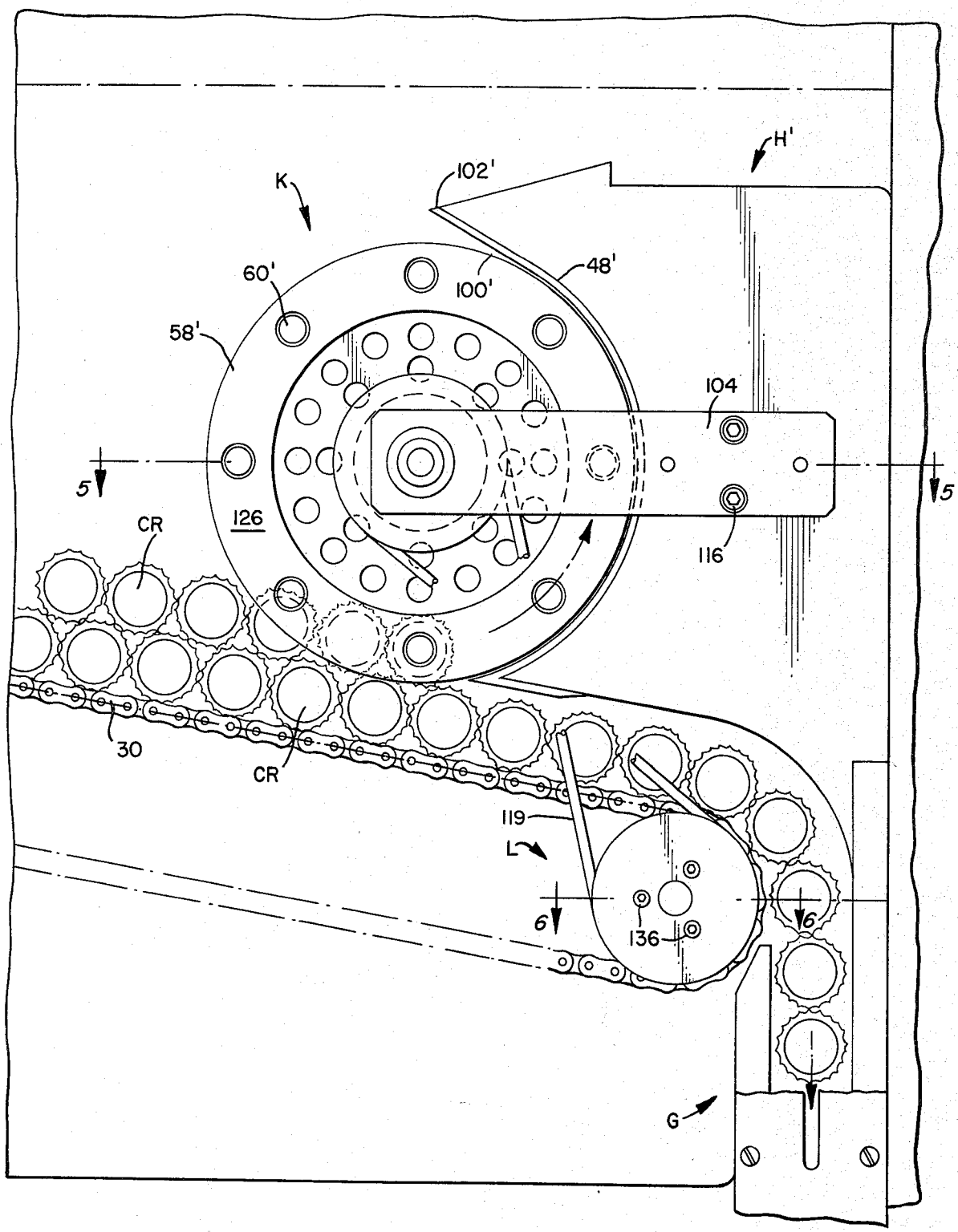
FIG. 4 is a view similar to FIG. 2, this view showing a form of the invention whereby an existing machine may be modified to include the improved magnetic anti-jamming means.

As shown in FIGS. 4 and 5, a support assembly K has a support arm 104 provided with a boss 106 at one end. At the opposite end of the support arm, a bore 108 is provided to receive a bearing assembly 110 for rotatably supporting a shaft 112. A deflecting member H' is sandwiched between the face of the boss and the inner face of the back cover 34 of the reservoir B. The deflecting member is held in position by spaced pins 114 extending through aligned openings in the deflecting member and the boss portion of the supporting arm, and the supporting arm is secured to the back cover by spaced bolts 116, one of which is shown, which pass through the deflecting member and into the back cover. Such connection of the parts secures the boss end of the supporting arm 104 to the machine, the other end being held by a nut 117 secured to a threaded portion extending axially from the shaft 112.

Fixed to the shaft 112 for rotation therewith is a circular disk member 58'. A pulley 118 is fixed to rotate with the disk member 58' by spaced bolts 120 which pass through an intermediate spacer 122. A belt 119 is associated with the pulley 118. The disk is of non-magnetic material and has fixed therein a plurality of permanent magnet inserts 60' as hereinbefore described in connection with the anti-jamming magnet means of FIGS. 1–3. As shown in FIGS. 4 and 5, the peripheral edge 100' of the disk member is located closely adjacent to the surface 48' of the deflection member H', the disk member being set or positioned in an annular opening 124 in the front wall 36 of the reservoir with the forward or operative face 126 of the disk member and its magnetic inserts which are flush with such face coplanar with the interior face 128 of the front wall.

As shown in FIG. 6, a sprocket assembly L is adapted to be connected to the drive means which rotates the conveyor chain 30. The sprocket assembly includes a pulley 130 fixed to a hub 132 of a chain sprocket 134 by spaced bolts 136. The chain 30 is engaged with sprocket 134, and the sprocket assembly is mounted on the stub shaft 138 which is secured to a support shaft. The drive belt 119, which is positioned around support assembly pulley 118, is connected to the pulley 130. As a result, the drive means for rotating the conveyor chain 30 also rotates the circular disk 58'. The operation of the magnetic anti-jamming device illustrated in FIGS. 4-6 is identical with the operation of the device illustrated in FIGS. 2 and 3.

The arrangement and structure of the modification kit shown in FIGS. 4-6 provides a convenient and inexpensive way to incorporate the advantages of the magnetic anti-jamming device of the invention into existing automatic feed hoppers of the construction disclosed in U.S. Pat. No. 4,006,812.

It is believed that the advantages and improved results afforded by the automatic feed hopper including the magnetic anti-jamming device of the invention will be apparent from the foregoing description of the several preferred embodiments thereof. Various modifications and changes may be made without departing from the spirit and scope of the invention as sought to be defined in the claims.

I claim:

1. In apparatus for feeding disk-like objects, the apparatus including a reservoir for storing the disk-like objects, the reservoir being dimensioned to receive a plurality of substantially horizontal rows of disk-like objects in a substantially vertical plane, a conveyor adjoining the reservoir for engagement with a substantial portion of the lowermost row of objects in the reservoir and for removing the disk-like objects from the reservoir, the disk-like objects being caused by gravity to engage the conveyor, means for driving the conveyor, an exit chute adjacent the conveyor to receive the disk-like objects in a single row, and a deflecting member positioned in the reservoir near the entrance to the exit chute to maintain the flow of disk-like objects in a single row from the conveyor into the exit chute, the deflecting member having an upper concave surface intersected by a lower curved surface leading into a side of the exit chute, the surfaces meeting at an edge located a distance above the surface of the conveyor slightly more than the diameter of a disk-like object, the improvement comprising magnetic means positioned with respect to the reservoir and related to the deflecting member and the conveyor for removing disk-like objects above said lowermost row of objects, and means for moving the magnetic means along a path adjacent to a portion of said upper concave surface in order to generate a centrifugal force sufficient to cause the disk-like objects attracted by said magnetic means to be ejected by said centrifugal force out into the reservoir when the disk-like objects pass the end of said upper concave surface.

2. In apparatus according to claim 1, wherein the magnetic means comprises a rotatable disk member of non-magnetic material having a plurality of circumferentially spaced magnets mounted therein and the moving means comprises means for rotating the rotatable disk member.

3. In apparatus according to claim 2, wherein the rotatable disk member of non-magnetic material and the magnets mounted therein is positioned with the front linear surface thereof coplanar with an interior surface of the reservoir.

4. In apparatus according to claim 3, wherein the rotatable disk member is circular and mounted for rotation so that the annular edge thereof is adjacent said upper concavely curved surface.

5. In an apparatus according to claim 2, wherein the rotatable disk member is circular and the upper concave surface subtends an arc approximately equal to one-half the circumference of the disk member.

6. In apparatus according to claim 2, wherein the means for rotating the rotatable disk member is coupled to the means for driving the conveyor.

7. In apparatus according to claim 2, wherein the reservoir comprises front and rear vertically arranged walls spaced apart slightly more than the thickness of a disk-like object, and wherein the rotatable disk member of non-magnetic material having the magnets mounted therein is positioned with the front linear surface thereof coplanar with the interior surface of the rear wall.

8. In apparatus according to claim 2, wherein the reservoir comprises front and rear vertically arranged walls spaced apart slightly more than the thickness of a disk-like object, and wherein the rotatable disk member of non-magnetic material having the magnets mounted therein is positioned with the front linear surface thereof coplanar with the interior surface of the front wall.

9. In apparatus according to claim 2, including support means adapted to be connected to the reservoir to support the rotatable disk member.

10. In apparatus according to claim 9, wherein the support means comprises an arm having an end for connection to the rear wall of the reservoir, a shaft at the opposite end of the arm having the rotatable disk member mounted thereon, and wherein the means for rotating the rotatable disk member includes means for rotating the shaft.

11. In apparatus for feeding disk-like objects, the apparatus including a reservoir for storing the disk-like objects, the reservoir being dimensioned to receive a plurality of substantially horizontal rows of disk-like objects in a substantially vertical plane, a conveyor adjoining the reservoir for engagement with a substantial portion of the lowermost row of objects in the reservoir and for removing the disk-like objects from the reservoir, the disk-like objects being caused by gravity to engage the conveyor, means for driving the conveyor, an exit chute adjacent the conveyor to receive the disk-like objects in a single row, and a deflecting member positioned in the reservoir near the entrance to the exit chute to maintain the flow of disk-like objects in a single row from the conveyor into the exit chute, the deflecting member having an upper concave surface intersected by a lower curved surface leading into a side of the exit chute, the surfaces meeting at an edge located a distance above the surface of the conveyor slightly more than the diameter of a disk-like object, the improvement comprising a rotatable disk member of non-magnetic material having a plurality of circumferentially spaced magnets mounted therein, the rotatable disk member being positioned with a front linear surface thereof coplanar with an interior surface of the reservoir and being related to the deflecting member and to the conveyor for removing disk-like objects above said lowermost row of objects, and means for rotating the rotatable disk member.

* * * * *